Dec. 2, 1941.  A. E. KARLBERG  2,264,983
SEAL FOR ROTATING SHAFTS
Filed July 20, 1936

Inventor:
Arvid E. Karlberg
By Louis Robertson
Atty.

Patented Dec. 2, 1941

2,264,983

UNITED STATES PATENT OFFICE 2,264,983

SEAL FOR ROTATING SHAFTS

Arvid E. Karlberg, Chicago, Ill., assignor to Chicago Seal Company, Chicago, Ill., a corporation of Illinois Application July 20, 1936, Serial No. 91,466

2 Claims. (Cl. 286—11)

This invention relates to seals for rotating shafts and is especially suitable for sealing the shaft of a compressor to prevent the escape of the gas from the compressor. In its illustrated form a rubber washer and a corrugated sleeve are successively slipped onto the shaft and are so arranged that the rubber seals the joint between the sleeve and the shaft and at the same time causes the sleeve to rotate with the shaft. The outer end of the sleeve is provided with a ground sealing surface, which bears against a correspondingly ground insert in a cover plate. If the seal becomes worn it may be repaired merely by removing the cover plate and slipping the sleeve off of the shaft.

In the past a great deal of thought has been devoted to providing a satisfactory seal which is suitable for use with refrigerating compressors. It should be understood that with such apparatus an absolutely gas-tight seal is important, especially in refrigerating units which are installed in homes where escaping gas might be poisonous and in any event would reduce the efficiency of the refrigerating system and yet a slow leak might continue without detection until the gas was seriously depleted. In order for the seal to be dependable it must also have some resilience, and the necessity of providing for relative rotation between the parts of the seal makes the matter quite difficult. Seals in the nature of spring pressed packing have been proposed, but such seals are objectionable for various reasons, such as excessive wear and the need for frequent tightening. A rotary metal seal has been commonly used in which the inner ground ring is sealed directly to the shaft by rubber, but if provision is made to compensate for wear, it is likely to become stuck to the shaft, or other part with respect to which it is supposed to slide, during long periods of idleness, as, for example, during shipping or storage.

Various ground metal seals have also been proposed and some of them, especially those in which one element of the ground seal was supported by a resilient corrugated sleeve, have given very satisfactory service most of the time. Such seals, however, have been very hard to repair when anything did go wrong, and in fact some of them have required that the whole motor be disassembled to remove the shaft so that it could be reground.

It is an object of the present invention to overcome the difficulties of the various prior art seals above mentioned and, in other words, to provide a seal which is ordinarily thoroughly satisfactory and which is nevertheless easily repaired when a repair is necessary, as after many years of service.

Another object of the invention is to provide a seal which accomplishes the above stated objects, which is nevertheless exceedingly simple and relatively inexpensive. These apparently irreconcilable objects are both accomplished largely by virtue of making both of the ground seal members removable, the one on the shaft being secured and sealed thereto in an exceedingly simple manner, as by bearing against a rubber washer.

Further objects and advantages of the invention will be apparent from the following description and from the drawing, in which.

Figure 1:
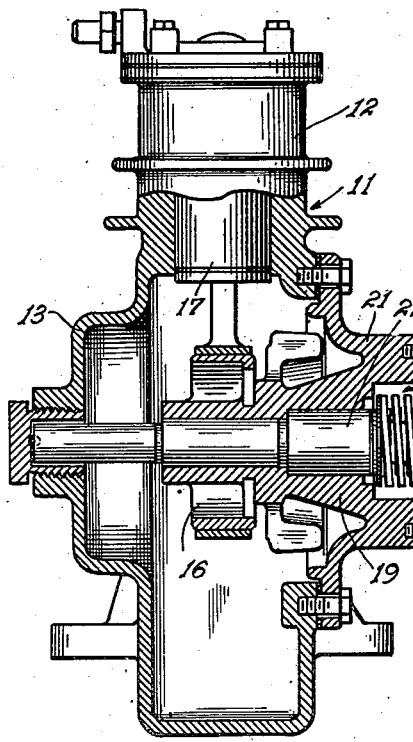
Fig. 1 is a plan view, partly in section, of a compressor unit showing the seal of this invention applied thereto.
Figure 3:
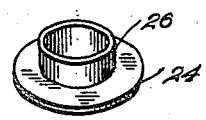
Fig. 3 is a perspective view of the rubber washer forming a part of this invention.
Figure 2:
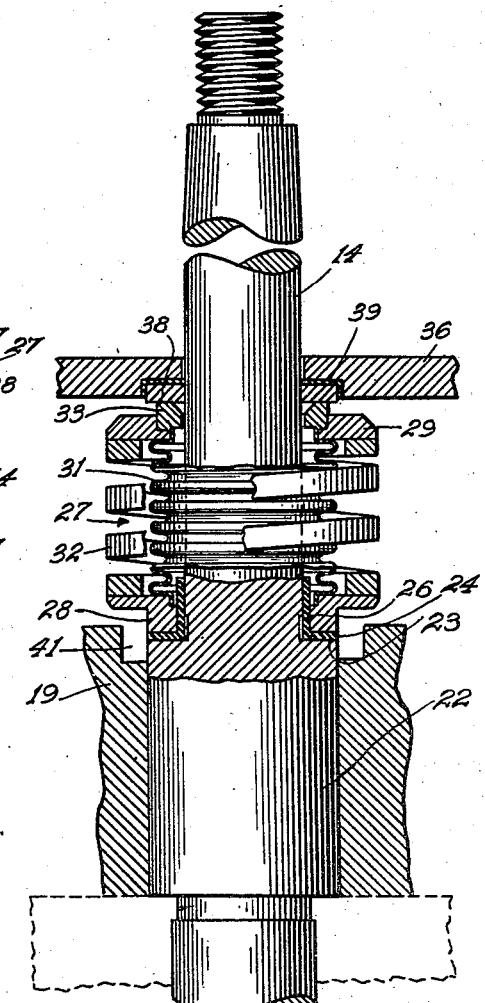
Fig. 2 is a fragmentary enlarged view showing particularly the shaft and the seal of Fig. 1.

Although this invention may take numerous forms and may have innumerable uses, only one form and one use have been chosen for illustration.

In the illustrated use, the seal is provided in connection with a compressor 11 such as might form a part of a refrigeration system. Such compressors commonly include a compression chamber 12, such as a cylinder, a housing 13, and a shaft 14 suitably journaled in the housing and having one end extending through the housing to be connected to suitable driving units. On the inner side of the housing the shaft rotates suitable mechanism such as an eccentric 16 operating the compressing means such as the piston 17. There is no difficulty in sealing any part of such a refrigerating system except at the point where the rotating shaft 14 passes through the housing 13. Ordinarily packing around the shaft 14 is not satisfactory since a seal is necessary which is gas-tight and which will remain so through years of service. The housing 13 will, of course, be provided with a bearing 19 which may conveniently be formed in a separable head 21. The shaft 14 is provided with a journal portion 22 rotating in the bearing 19.

The external portion of the shaft 14 is of reduced diameter so as to form an annular shoulder 23 at the end of the journal portion 22. A rubber washer 24 having a sleeve-shaped flange 26 fits against the shoulder 23. A resilient sleeve assembly 27 surrounds the shaft 14 and at its inner end is sealed with respect to the shaft by the washer 24. The resilient sleeve assembly 27 includes an inner ring 28, an outer ring 29, a flexible corrugated metal sleeve 31, such as is used for bellows, and a fairly stiff coil spring 32. The ring 29 may be in one piece or may include a separate ground seal member 33. Of course, the seal 33 and the ring 28 must be secured to the sleeve 31 in a gas-tight manner as by soldering or brazing.

A cover plate 36 is secured to the head 21 as by suitable screws 37. This cover plate carries a ground seal member 38, which, as illustrated, is preferably formed in a separate piece secured to the plate 36. This seal ring 38 may be secured to the cover plate by any suitable cement, by solder or the like, or by a rubber washer 39, as illustrated. If a rubber washer is used, it is preferably of L-shape in cross-section as shown so as to retain the sealing ring 38 in place in the plate 36 even when there is nothing else holding the two parts together. With the parts in the assembled positions illustrated, the spring 32 is considerably compressed so that it presses the ring 28 firmly against the washer 24 and also presses the ring 38 firmly against the washer 39, as well as pressing the sliding seal members 33 and 38 tightly together.

The pressure on these washers will not only make the seal gas-tight but it will also cause the seal members to rotate or remain stationary in accordance with their obviously intended purposes. Furthermore, the pressure on the rubber will prevent its being affected too greatly by the lubricating oil present in the compressors. As an added measure of safety in this respect, however, it is preferred that the rubber be of an oil resisting type, such as now made commercially, one of which is the artificial rubber known as Duprene. Also it is preferred that the shoulder 23 be positioned forwardly of the adjacent portion of the bearing 19 so that there will be no danger that the rubber 24 will come in contact with the bearing 19. To this end, an annular notch 41 may be formed in the bearing, if desired.

The sleeve assembly 27 is supported in centered position with respect to the shaft by the sleeve-shaped flange 26 of the washer 24. The most convenient way of assembling the parts will usually be to slip the washer into the ring 28 with the sleeve 26 extending through said ring and then slip the sleeve assembly 27 together with the washer 24 onto the shaft 14. The outer end of the shaft 14 is preferably tapered to facilitate this assembly.

Suitable gas-tight gaskets will, of course, be provided between the head 21 and the remainder of the casing 13 between the cover plate 36 and the head 21. The result is a completely gas-tight seal for the rotating shaft 14 with respect to the housing 13 and associated parts. The rubber washer 24 completely seals the joint between the shaft 14 and the sleeve assembly 27. The ring 33 has a gas-tight sliding ground joint engagement with the ring 38, and the washer 39 forms a gas-tight seal between the ring 38 and the cover plate 36. It incidentally provides a slight degree of resiliency at this point, which will help compensate for slight angular displacement in either part of the ground joint.

In spite of the effectiveness and simplicity of this seal, it is very easily repaired simply by removing the bolts 37, lifting off the cover plate 36, and sliding off the sleeve assembly 27. The rings 33 and 38 may be reground or replaced and the parts again reassembled without the necessity of removing the shaft 14. This would still be true even if the parts were reversed and a seal ring similar to 38 placed against the washer 24 while the complemental seal member was secured to cover plate 36.

As a matter of fact, it will almost never be necessary to regrind the seal because the seal ring 38 (on account of being mounted in rubber) can be made of a glass-hard metal such as water hardened tool steel, and it can be ground on both sides to be reversed. The ring 33 is of a material such as a soft bronze which is enough softer to cause very little wear on the ring 38.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. In association with an enclosed seal chamber having a removable cover secured thereto and a shaft extending through the cover and having an abutment formed on and rigid with the shaft spaced from said cover, the combination of a sealing organization carried entirely within the chamber and including an axially movable sleeve hermetically sealing and adapted to rotate with the shaft substantially co-extensive in length with and enclosing the shaft between the spaced removable cover and the shaft abutment, a resilient sealing ring interposed between said abutment and the end of said sleeve adjacent the abutment, said sleeve being recessed to receive a portion of said resilient sealing ring, said resilient sealing ring surrounding the shaft and having bearing against both the shaft and the shaft abutment and adapted to receive both axial and radial adjustment for securing said sleeve to said shaft for rotation therewith and for fixedly sealing the related end portion of the sleeve to the shaft, said cover being recessed, a removable insert comprising a non-rotatable metallic sealing ring member surrounding said shaft and interposed between the cover and the related end portion of said sleeve and in said recess and having bearing against the related end portion of said sleeve to effectuate a running seal therewith, and a replaceable and resilient sealing ring positioned in said recess in said cover between the cover and said insert partially enclosing said insert whereby said insert is adapted to receive both axial and radial adjustment for fixedly sealing the insert to the cover and maintaining the sealing surfaces of the running seal in operative engagement.

2. The combination of a housing, a shaft extending therethrough and rotatably journaled therein, a cover secured to the housing and surrounding said shaft, and forming one wall of said housing, sealing means for the shaft, said sealing means embodying a sleeve of substantial length within the housing and encompassing the shaft, an abutment on the shaft spaced from one of the housing walls, a resilient seal between one end of the sleeve and the shaft and also between the adjacent extremity of the sleeve and the said abutment whereby one end of the sleeve will be yieldingly secured and sealed to the shaft, a seal between the other end of the sleeve and the said housing wall and embodying a bearing element formed on the adjacent end of the sleeve, a bearing plate recessed into said wall and with which plate the said bearing element has rotative engagement, and a packing element disposed between said wall and said bearing plate and encompassing the periphery of the plate, the said sleeve in its entirety rotating with and hermetically sealed to the shaft and also free from rigid anchorage at both ends, whereby said sleeve will be relieved of excessive torsional strains, the sealing means at both ends of the sleeve being adapted to receive both axial and radial adjustment

ARVID E. KARLBERG.